(12) United States Patent
Chandwadkar et al.

(10) Patent No.: US 7,719,974 B2
(45) Date of Patent: *May 18, 2010

(54) SYSTEM AND METHOD FOR LOADBALANCING IN A NETWORK ENVIRONMENT USING FEEDBACK INFORMATION

(75) Inventors: Ashish A. Chandwadkar, Morrisville, NC (US); Jayaraman R. Iyer, Sunnyvale, CA (US); Chris O'Rourke, Apex, NC (US)

(73) Assignee: Cisco Technology, Inc., San Jose, CA (US)

( * ) Notice: Subject to any disclaimer, the term of this patent is extended or adjusted under 35 U.S.C. 154(b) by 917 days.

This patent is subject to a terminal disclaimer.

(21) Appl. No.: 11/326,935

(22) Filed: Jan. 6, 2006

(65) Prior Publication Data

US 2006/0109785 A1 May 25, 2006

Related U.S. Application Data (63) Continuation of application No. 10/873,442, filed on Jun. 21, 2004, now Pat. No. 7,020,090.

(51) Int. Cl.
*H04L 12/26* (2006.01)
*G06F 15/16* (2006.01)

(52) U.S. Cl. ............... 370/230; 370/235; 370/249; 709/229

(58) Field of Classification Search ......... 370/229–234, 370/235–238, 249, 254; 709/223, 225–226, 709/229, 238–244
See application file for complete search history.

(56) References Cited

U.S. PATENT DOCUMENTS

| 5,774,660 | A | 6/1998 | Brendel et al. ......... 395/200.31 |
| 5,951,694 | A | 9/1999 | Choquier et al. ............. 714/15 |
| 6,006,264 | A | 12/1999 | Colby et al. ................ 709/226 |
| 6,016,305 | A | 1/2000 | Borst et al. ................. 370/234 |
| 6,028,838 | A | 2/2000 | Yamamura et al. .......... 370/229 |
| 6,034,946 | A | 3/2000 | Roginsky et al. ............ 370/238 |
| 6,128,642 | A | 10/2000 | Doraswamy et al. ........ 709/201 |
| 6,128,657 | A | 10/2000 | Okanoya et al. ............ 709/224 |
| 6,137,777 | A | 10/2000 | Vaid et al. ................... 370/230 |
| 6,185,619 | B1 | 2/2001 | Joffe et al. .................. 709/229 |
| 6,201,962 | B1 | 3/2001 | Sturniolo et al. ............ 455/432 |
| 6,249,801 | B1 | 6/2001 | Zisapel et al. ............... 709/105 |
| 6,259,705 | B1 | 7/2001 | Takahashi et al. ........... 370/465 |

(Continued)

OTHER PUBLICATIONS

Information Sciences Institute, "Internet Protocol, Darpa Internet Program Protocol Specification," Univ. of Southern California, 49 pgs, Sep. 1981.

(Continued)

*Primary Examiner*—Tri H Phan
(74) *Attorney, Agent, or Firm*—Baker Botts L.L.P.

(57) ABSTRACT

A method for loadbalancing in a network environment is provided that includes receiving a request from an end user for a communication session at a central node. The method further includes identifying a selected one of a plurality of network nodes to facilitate the communication session for the end user based on feedback information provided by the selected network node. The feedback information is communicated from the selected network node and processed before making a decision to establish the communication session between the selected network node and the end user.

14 Claims, 2 Drawing Sheets

U.S. PATENT DOCUMENTS

| | | | |
|---|---|---|---|
| 6,263,368 B1 | 7/2001 | Martin | 709/224 |
| 6,285,748 B1 | 9/2001 | Lewis | 378/112.01 |
| 6,298,383 B1 | 10/2001 | Gutman et al. | 709/229 |
| 6,327,622 B1 * | 12/2001 | Jindal et al. | 709/228 |
| 6,330,602 B1 | 12/2001 | Law et al. | 709/224 |
| 6,362,836 B1 * | 3/2002 | Shaw et al. | 715/744 |
| 6,377,571 B1 | 4/2002 | Tai | 370/355 |
| 6,377,982 B1 | 4/2002 | Rai et al. | 709/217 |
| 6,393,458 B1 | 5/2002 | Gigliotti et al. | 709/203 |
| 6,393,482 B1 | 5/2002 | Rai et al. | 709/225 |
| 6,400,722 B1 | 6/2002 | Chuah et al. | 370/401 |
| 6,414,950 B1 | 7/2002 | Rai et al. | 370/338 |
| 6,421,714 B1 | 7/2002 | Rai et al. | 709/217 |
| 6,434,618 B1 | 8/2002 | Cohen et al. | 709/228 |
| 6,442,165 B1 | 8/2002 | Sitaraman et al. | 370/395.4 |
| 6,466,571 B1 | 10/2002 | Dynarski et al. | 370/352 |
| 6,473,802 B2 | 10/2002 | Masters | 709/229 |
| 6,484,143 B1 | 11/2002 | Swildens et al. | 705/1 |
| 6,512,754 B2 | 1/2003 | Feder et al. | 370/338 |
| 6,529,501 B1 | 3/2003 | Zhao et al. | 370/353 |
| 6,658,473 B1 * | 12/2003 | Block et al. | 709/226 |
| 6,760,303 B1 | 7/2004 | Brouwer | 370/229 |
| 6,853,642 B1 * | 2/2005 | Sitaraman et al. | 370/395.4 |
| 7,340,744 B2 * | 3/2008 | Chandwadkar et al. | 718/105 |

OTHER PUBLICATIONS

S. Deering, "Host Extensions for IP Multicasting," Stanford University, 17 pgs, Aug. 1989.

Communication from the State Intellectual Property Office of the People's Republic of China; First Office Action of Chinese Patent Application No. 200580018775.0 transmitted to Baker Botts on Jun. 23, 2009; 18 pages.

* cited by examiner

SYSTEM AND METHOD FOR LOADBALANCING IN A NETWORK ENVIRONMENT USING FEEDBACK INFORMATION

CROSS-REFERENCE TO RELATED APPLICATION

This application is a continuation of U.S. application Ser. No. 10/873,442 filed Jun. 21, 2004 now U.S. Pat. No. 7,020,090 and entitled "System and Method for Loadbalancing in a Network Environment Using Feedback Information."

TECHNICAL FIELD OF THE INVENTION

This invention relates in general to the field of communications and, more particularly, to a system and method for loadbalancing in a network environment using feedback information.

BACKGROUND OF THE INVENTION

Networking architectures have grown increasingly complex in communications environments. In addition, the augmentation of clients or end users wishing to communicate in a network environment has caused many networking configurations and systems to respond by adding elements to accommodate the increase in networking traffic. Communication tunnels or links may be used in order to establish or to gain access to a network, whereby an end user or an object may initiate a tunneling protocol by invoking a selected location or a network node. The network node or selected location may then provide a platform that the end user may use to conduct a communication session.

As the subscriber base of end users increases, proper routing and efficient management of communication sessions and data flows becomes even more critical. Having access to, or being aware of, network node capabilities and/or current activity is important for executing proper loadbalancing techniques. In cases where improper loadbalancing protocols are executed, certain network components may be overwhelmed while other (potentially more capable) network resources remain unavailable and untapped. Such an imbalanced scenario may decrease throughput and inhibit the flow of network traffic: causing congestion or bottlenecks in the system. In a worst-case scenario, a requested communication session fails because a central node is unable to assess which nodes are actually capable of accommodating a session or a flow.

SUMMARY OF THE INVENTION

From the foregoing, it may be appreciated by those skilled in the art that a need has arisen for an improved communications approach that provides for more accurate loadbalancing based on accurate feedback information provided by communications between two end points or nodes. In accordance with one embodiment of the present invention, a system and method for loadbalancing are provided that greatly reduce disadvantages and problems associated with conventional loadbalancing techniques.

According to one embodiment of the present invention, there is provided a method for loadbalancing in a network environment that includes receiving a request from an end user for a communication session at a central node. The method further includes identifying a selected one of a plurality of network nodes to facilitate the communication session for the end user based on feedback information provided by the selected network node. The feedback information is communicated from the selected network node and processed before making a decision to establish the communication session between the selected network node and the end user.

In other embodiments, a table may be used to store previously received feedback information associated with a plurality of network nodes. The table may be referenced by the central node such that a loadbalancing decision may be executed based on the feedback information included in the table. In such a scenario, current feedback information from a selected network node does not have to be received (nor is it considered) before executing the loadbalancing decision.

Certain embodiments of the present invention may provide a number of technical advantages. For example, according to one embodiment of the present invention a communications approach is provided that allows a loadbalancer to more accurately distribute work to multiple network nodes. This is a result of a loadbalancer that can make loadbalancing decisions based on feedback information received from any one or more of the available network nodes. The loadbalancer may then direct a create request to a network node that is most capable of handling the incoming flow. For example, the loadbalancer may recognize that a given network node with the least number of current sessions should receive the flow. By referencing a data structure or a table that maintains such information, effective loadbalancing is achieved as data may be properly directed to network nodes that are most capable of accommodating traffic flows. Moreover, the improved capacity of the loadbalancer provides a better user experience as connection requests need not be constantly retried in order to connect to an alternate server. This may further eliminate any need to run back off timers or delay a given connection further.

Yet another technical advantage associated with one embodiment of the present invention is the result of the operation of the loadbalancer. The loadbalancer may effectively gain intelligence by evaluating and categorizing feedback information. The feedback information may include capabilities of the nodes such as the ability to handle certain types of flows or specific types of quality of service levels. This information may serve as a basis for the loadbalancer to efficiently deliver data to an optimal network node. Certain embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF EXAMPLE EMBODIMENTS OF THE INVENTION

Figure 1:
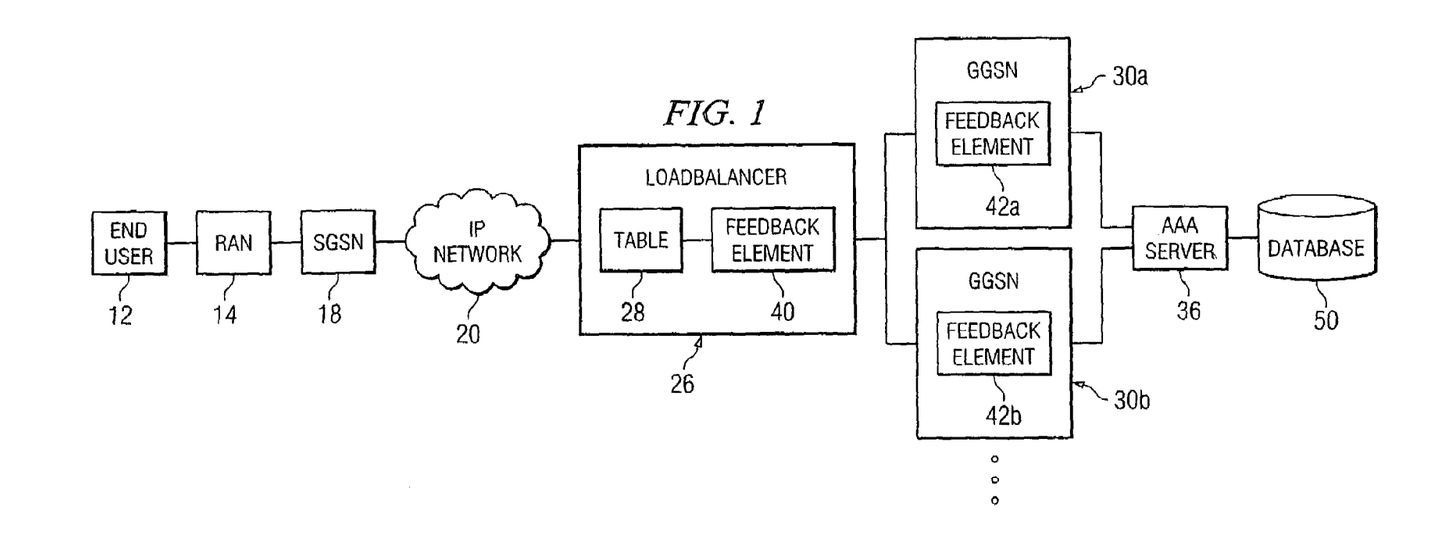
FIG. 1 is a simplified block diagram of a communications system for loadbalancing in a network environment in accordance with one embodiment of the present invention.

FIG. 1 is a simplified block diagram of a communication system 10 for communicating data in a network environment. Communication system 10 may include an end user 12, a radio access network (RAN) 14, a serving general packet radio service (GPRS) support node (SGSN) 18, and an internet protocol (IP) network 20. Additionally, communication system 10 may include a loadbalancer 26 (that may include a table 28) and multiple gateway GPRS support nodes (GGSNs) 30a-b. Communication system 10 may further include multiple feedback elements 40, 42a, and 42b. Communication system 10 may also include an authentication, authorization, and accounting (AAA) server 36 and a database 50.

FIG. 1 may be generally configured or arranged to represent a 2.5G communication architecture applicable to a Global System for Mobile (GSM) environment in accordance with a particular embodiment of the present invention. However, the 2.5G architecture is offered for purposes of example only and may alternatively be substituted with any suitable networking protocol or arrangement that provides a communicative platform for communication system 10. For example, communication system 10 may cooperate with any version of a GPRS tunneling protocol (GTP) that includes loadbalancing operations. This may be inclusive of first generation, 2G, and 3G architectures that provide features for workload distribution.

In order to understand the extent of the teachings of communication system 10, it is useful to offer some overview as to the way in which user connections are generally managed. This description is offered for purposes of example only and should not be construed in any way to limit the principles, characteristics, and features of the present invention.

In general, when sessions or applications are deployed in a loadbalancing environment, user connections can be rejected by application servers for a variety of reasons. For example, some of the more common rejections may include: no available server capacity, an illegal connection request from the client, an unauthorized client access, or an inability to service a specific type of client. As network applications evolve and as user personalization services are deployed, the nature of these rejection causes is also evolving. For example, one rejection may be made on the basis of a user's quality of service (QoS) profile, which is known to the server only after retrieving data from, for example, a backend database.

Server protocols generally do not provide a mechanism to deliver reject causes to the client. Even in protocols that do provide reject causes, the granularity of the causes is not sufficient to identify the true cause of the rejection. Under such conditions, without specific information about the cause of the rejection, a given loadbalancer is unable to make an intelligent decision as to whether the rejection was caused due to a single server capacity issue, or if the connection would be rejected by any of the servers in the cluster. As a result, the loadbalancer either has to forward all reject messages to the client, or to discard all reject messages and await client retransmission to attempt this request on another server.

An example application where such a dilemma is seen is within GPRS GTP tunnel loadbalancing, where a selected GGSN can reject a client's packet data protocol (PDP) create request due to a lack of available bandwidth. This rejection occurs while another GGSN in the cluster has adequate resources to establish the PDP context.

In accordance with the teachings of the present invention, communication system 10 avoids such problems and issues and offers a loadbalancing operation that provides optimal communications between end user 12 and selected GGSNs 30a-b. Communication system 10 extends server feedback to provide per-connection reject cause information to a given loadbalancer. This is particularly useful in cases where the user's profile, stored (most likely) in a database, determines the server resources required by that user. In such a scenario, the client's request has no indication of required resources and the loadbalancer would have no way of determining if the request could be handled by a given server without having feedback information being provided.

In operation of an example embodiment used for purposes of illustration, a given GGSN can communicate the cause of a connection rejection to loadbalancer 26, along with the original user connection request. Loadbalancer 26 can then determine the appropriate action based on the rejection cause. If loadbalancer 26 deems the reject cause to be local to the first selected GGSN, another GGSN can be readily selected and the original connection request forwarded to that GGSN, which may be capable of handling the request. If the cause of the rejection would be ubiquitous across the farm of servers, or if there are no alternate servers currently available to reassign the flow, loadbalancer 26 can generate a connection reject message for the user.

Such a protocol enables loadbalancer 26 to better manage load and user requests by providing connection reject cause information to loadbalancer 26. The feedback information may be used to determine if the reject cause is local to a specific server (in which case the connection can be re-attempted on an alternate server) or if the reject cause would be generated by any server in the cluster.

Note that in traditional loadbalancing, the loadbalancer gleans information on a packet level or ascertains information by snooping traffic in order to make a loadbalancing decision that is accurate. In many cases, such a decision is adequate: albeit not entirely complete. In other cases, the loadbalancer may not arrive at a proper decision based on the limited information that is currently possesses.

Thus, the loadbalancer can only make a loadbalancing decision based on the limited parameters that it knows. Such limited parameters (e.g. load, weight, etc.) are highly generic. The selected GGSN generally provides the final confirmation that it can accommodate the assigned flow. In these scenarios, the selected GGSN may not be able to handle the flow, but a second (adjacent or local) GGSN (which is available) could have aptly handled the connection. In other cases, none of the GGSNs could have handled the flow. An "authentication failure" is an example of an error that is problematic because it is generic and, further, it prohibits any given GGSN from accommodating such a flow. Hence, in such a scenario, greater specificity in the offered information could enable loadbalancer 26 to quickly recognize that none of the GGSNs can service this request.

Communication system 10 can avoid such deficiencies by providing feedback on a per-session or a per-flow basis. A data segment or tag can be provided in the feedback information (between the selected GGSN and loadbalancer 26) that indicates that the selected GGSN (e.g. GGSN 30a) cannot handle the requested session and, further, that loadbalancer 26 should choose another GGSN. This process of forwarding the request to a subsequent GGSN may be repeated until identification of a given GGSN that has the resources to fulfill the requirements of the session. The feedback provided by feedback elements 42a and 42b to feedback element 40 can be a proprietary protocol or it can be leveraged from an existing protocol already being executed on these machines. For example, the GTP protocol between SGSN 18 and selected GGSNs 30a and 30b could be leveraged in order to provide this feedback.

Such an approach provides precise feedback to loadbalancer 26 such that it can make better judgments about how to loadbalance. Furthermore, because this communication only involves loadbalancer 26 and a selected GGSN, it does not implicate SGSN 18. For example, if SGSN 18 has made a request to loadbalancer 26, loadbalancer 26 could then communicate with several GGSNs (via several round trip communications involving loadbalancer 26 and the GGSNs) before making sure that the selected GGSN can handle the flow. Accordingly, loadbalancer 26 could continuously bounce a request off given GGSNs before actually assigning the flow to a selected GGSN. This relay of feedback information between loadbalancer 26 and GGSNs 30a and 30b may continue without involving SGSN 18, which is unaware of such communications.

Additionally, the feedback provided to loadbalancer 26 may not only be used in the current loadbalancing decision, it may also be used in future loadbalancing decisions. Table 28 may be used to store the feedback information, which can be referenced at any time in order to make a loadbalancing decision. Table 28 could include any suitable feedback information and/or characteristics about any existing GGSN, which could possibly receive a session or a flow. Thus, loadbalancer 26 may make future loadbalancing decisions based on the information in table 28 or simply make a more informed loadbalancing decision based on the current feedback provided by a given GGSN.

Loadbalancer 26 more accurately distributes work to multiple network nodes by inspecting table 28 and by communicating with a selected GGSN. Such an approach achieves more effective loadbalancing as data may be properly directed to network nodes that are most capable of accommodating additional traffic flows. Moreover, the improved capacity of loadbalancer 26 provides a better user experience as connection requests need not be retried in order to connect to an alternate server. This may further eliminate any need to run back-off timers or to delay a given connection further.

Figure 2:
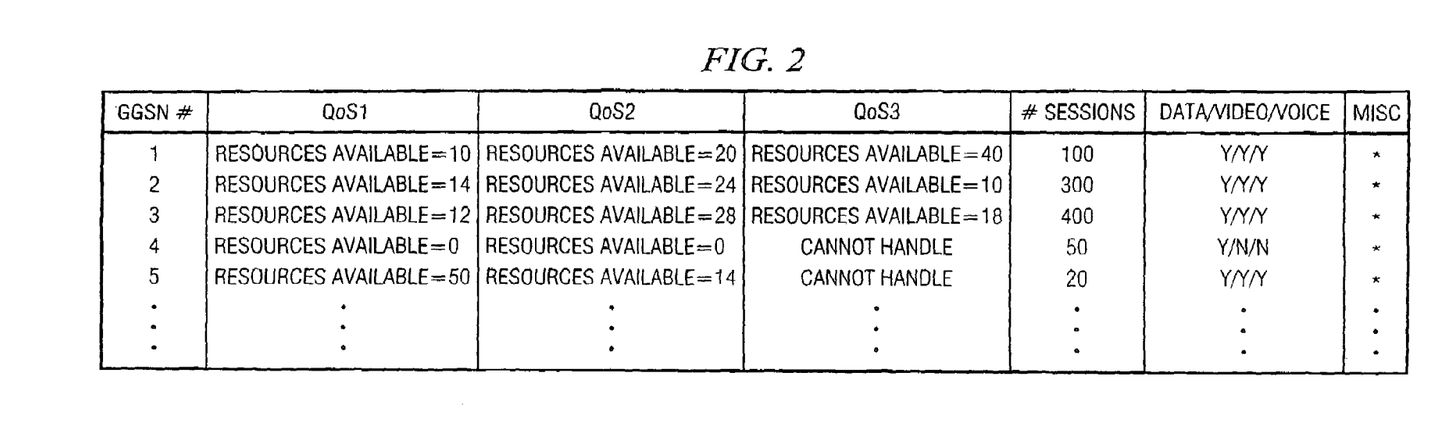
FIG. 2 is a simplified block diagram of a table that may be included within a loadbalancer that is provided in the communication system.

Loadbalancer 26 may effectively gain intelligence by evaluating and categorizing feedback information provided by the GGSNs. The feedback information may include capabilities of the GGSNs such as the ability to handle certain types of flows or to accommodate specific types of quality of service levels. FIG. 2, which is described in greater detail below, offers an example set of GGSN parameters that are provided by feedback information in one example network configuration. Other types of feedback information may be readily accommodated by communication system 10. This feedback information, in turn, allows loadbalancer 26 to efficiently deliver data to an optimal network node. The operation of loadbalancer 26 may further alleviate strain that is placed on network nodes that continue to receive communication flows when they are incapable of withstanding additional tasks.

End user 12 is a client or a customer wishing to initiate a communication in communication system 10 via IP network 20. End user 12 may be inclusive of devices used to initiate a communication, such as a computer, a personal digital assistant (PDA), a laptop or an electronic notebook, a telephone, a mobile station, or any other device, component, element, or object capable of initiating voice or data exchanges within communication system 10. End user 12 may also be inclusive of a suitable interface to the human user, such as a microphone, a display, a keyboard, or other terminal equipment (such as for example an interface to a personal computer or to a facsimile machine in cases where end user 12 is used as a modem). End user 12 may also be any device that seeks to initiate a communication on behalf of another entity or element, such as a program, a database, or any other component, device, element, or object capable of initiating a voice or a data exchange within communication system 10. Data, as used herein in this document, refers to any type of numeric, voice, video, audio-visual, or script data, or any type of source or object code, or any other suitable information in any appropriate format that may be communicated from one point to another.

RAN 14 is a communications interface between end user 12 and SGSN 18. RAN 14 may comprise a base transceiver station and a base station controller. The communications interface provided by RAN 14 offers connectivity and allows data to be exchanged between end user 12 and any number of selected elements within communication system 10. RAN 14 facilitates the delivery of a request packet generated by end user 12 and the reception of information sought by end user 12. RAN 14 is only one example of a communications interface between end user 12 and SGSN 18. Other types of communications interfaces may be used for a desired network design based on particular needs.

IP network 20 represents a series of points or nodes of interconnected communication paths for receiving and transmitting packets of information that propagate through communication system 10. IP network 20 offers a communicative interface between end user 12 and selected GGSNs 30a-b and may be any local area network (LAN), wireless local area network (WLAN), metropolitan area network (MAN), wide area network (WAN), virtual private network (VPN), or any other appropriate architecture or system that facilitates communications in a network environment. IP network 20 implements a user datagram protocol (UDP)/internet protocol (UDP/IP) communication language protocol in a particular embodiment of the present invention. However, IP network 20 may alternatively implement any other suitable communication protocol for transmitting and receiving data or information within communication system 10.

SGSN 18 and GGSNs 30a-b are network elements that cooperate in order to facilitate a communication session involving end user 12. GGSNs 30a-b are network nodes that may be working in conjunction with multiple SGSNs 18 to provide a communications medium in a GPRS service network environment in communicating data exchanges within communication system 10. GPRS represents a packet-based data bearer service for communication services that may be delivered as a network overlay for any type of suitable network configuration or platform. GPRS generally applies packet-radio and packet switching principles to transfer data packets in an efficient way between GSM elements or units and external packet data networks. GPRS may support multiple internet communication protocols and may enable existing IP, X.25, or any other suitable applications or platforms to operate over GSM connections.

Loadbalancer 26 is an element or a device that receives requests and then distributes those requests to the next available server or node. Loadbalancer 26 may be considered as a central node or an intermediary between end user 12 and any number of GGSNs. The available server or node to receive the session may be any computer or device on a network that can manage network resources or process data. For example, the network node may be a selected GGSN 30a-b. Such loadbalancing decisions may be executed based on suitable algorithms, software, or hardware provided in loadbalancer 26. Loadbalancer 26 may also include feedback element 40, which is coupled to table 28. These two elements may cooperate in order to store and reference data pertaining to selected GGSNs in the network. Additionally, these two elements may be included in software in one example embodiment. Alternatively, these two elements may be provided in appropriate hardware (or a combination of hardware and software), or in any appropriate component, device, element, or object that suitably assists or facilitates their operations. In addition, these elements may be included together in a single module and/or be provided external to loadbalancer 26 where appropriate and based on particular needs.

Loadbalancer 26 may also perform other suitable loadbalancing tasks, such as dividing the amount of work that an element has to do between two or more elements to ensure more work gets done in the same amount of time and, in general, accommodating end users 12 more quickly. Loadbalancer 26 may be replaced by any other suitable network element such as a router, a switch, a bridge, a gateway, or any other suitable element, component, device, or object operable to facilitate data reception or transmission in a network environment. Additionally, loadbalancer 26 may include any appropriate hardware, software, (or a combination of both) or any appropriate component, device, element, or object that suitably assists or facilitates traffic management in a network.

In operation of an example embodiment, loadbalancer 26 may execute loadbalancing decisions for selected GGSNs 30*a-b*. Inbound and outbound signaling traffic to and from SGSN 18 and GGSNs 30*a-b* may flow through loadbalancer 26 (in whole or in part). Loadbalancer 26 may filter the traffic using any appropriate criterion, such as source IP address, destination IP address, source port, destination port, protocol tuple, or any other suitable parameter or characteristic. Loadbalancer 26 may initially attempt to create a session on the first (primary) create request. A session may be identified by the client (SGSN) IP address and port, server (GGSN) IP address and port, protocol and session key, or any other suitable parameters where appropriate. For GTP version one, loadbalancer 26 may create a session per tunnel end point identifier (TEID).

Loadbalancer 26 may reference table 28 and/or inspect feedback information provided by a given GGSN before assigning a flow to that GGSN. Table 28 may include the capabilities of a specific GGSN and be vectored according to any suitable categories. For example, one category could be QoS, which could be further characterized by what types of QoS the specific GGSN can handle. (Note: Additional details relating to table 28 are provided below and illustrated by FIG. 2.) Once loadbalancer 26 has processed the feedback information and/or referenced table 28, the session may then be directed to a given GGSN most capable of handling the session. By using such information before making the loadbalancing decision, loadbalancer 26 ensures a high probability of success for the create request from end user 12.

AAA server 36 is a server program that can manage end user 12 requests for access to networking resources. For a corresponding network, AAA server 36 also provides authentication, authorization, and accounting services and management. Authorization generally refers to the process of giving end user 12 permission to do or to access something. In multi-user computer systems, a system administrator may define for the system which end users are allowed access to certain data in the system and, further, what privileges are provided for end user 12. Once end user 12 has logged into a network, such as for example IP network 20, the network may wish to identify what resources end user 12 is given during the communication session. Thus, authorization within communication system 10 may be seen as both a preliminary setting up of permissions by a system administrator and the actual checking or verification of the permission values that have been set up when end user 12 is attempting access. Authentication generally refers to the process of determining whether end user 12 is in fact who or what it is declared to be. In the case of private or public computer networks, authentication may be commonly done through the use of unique identification elements or log-on passwords. Knowledge of the password offers a presumption that end user 12 is authentic. Accounting generally refers to tracking usage for each end user 12 and may additionally include trafficking information or data relating to other information flows within communication system 10 or within a particular sub-network.

AAA server 36 may receive the IP address and other parameters from any suitable source, such as an appropriate network gateway or alternatively from a dynamic host configuration protocol (DHCP) server or a domain name system (DNS) database element, in order to direct data to be communicated to end user 12. AAA server 36 may include any suitable hardware, software, components, or elements that operate to receive data associated with end user 12 and provide corresponding AAA related functions to network components within communication system 10. Authorization and IP address management may be retrieved by AAA server 36 from a layer two tunneling protocol network server (LNS), which may be provided to address secure services for end user 12 where appropriate.

Database 50 may communicate with AAA server 36 and include any suitable software, hardware, random access memory (RAM), application specific integrated circuit (ASIC), algorithm, read-only memory (ROM), erasable programmable ROM (EPROM), electronically EPROM (EEPROM), or any other suitable component, device, element or object operable to store network information or information about a given set of end users. In one example embodiment, database 50 may include a number of user profiles for any given end users. The profiles may include QoS information, as well as any other relevant information for processing a flow or session. GGSNs 30*a* and 30*b* may reference database 50 via AAA server 36 in order to identify a QoS level for an end user and to ascertain resource requirements that are going to be needed for a given session or flow. GGSNs 30*a* and 30*b* may then consider their available resources before providing a feedback response to loadbalancer 26.

Database 50 may communicate with AAA server 36 and include a table for properly storing one or more end user profiles to be used in routing information or data in communication system 10. The table included within database 50 may be populated in a variety of ways. For example, when end user 12 connects to the network, a RADIUS request is made on its behalf by a network access server (NAS) or any other appropriate device. In a mobile networking scenario, this request, potentially referred to as an Access-Request, may contain the user-ID in the User-Name attribute or in the calling station-ID attribute, which uniquely identifies which end user is requesting the information from the network. If AAA server 36 authenticates and authorizes end user 12 successfully, a RADIUS Access-Accept message may be communicated back to the RADIUS client (or a NAS) with an IP address in the framed-IP address attribute. This IP address may be the address used by end user 12 when it sends IP packets to any given location in the network. The RADIUS packets exchanged may be inspected such that a table is built that binds a user-ID with an assigned IP address. Entries within the table may be cleaned up, deleted, or updated periodically (or alternatively updated or changed based on some event or modification to system parameters) in order to accurately reflect one or more profiles associated with one or more end users 12. Entries could also be deleted specifically or deleted per communications flow. In the case of RADIUS messaging, the population of the table may be controlled by RADIUS accounting messages or by any other suitable populating protocol according to particular needs.

FIG. 2 is a simplified block diagram illustrating table 28 in an example implementation of communication system 10. Table 28 may be stored within, or provided external to, loadbalancer 26. Table 28 may include any suitable software, hardware, RAM, ASIC, algorithm, ROM, EPROM, EEPROM, or in any other suitable component, device, element or object where appropriate and based on particular needs. Table 28 may be readily replaced with a database or any other suitable memory element operable to store feedback information.

As illustrated in FIG. 2, table 28 may include any suitable information associated with session objects, allocations made for each GGSN 30a-b, or other networking data in accordance with particular needs. In one example implementation, table 28 includes a GGSN # column, multiple QoS type columns, a # of sessions capability column, a data/video/voice capability column, and a miscellaneous column. Such categories of information are not exhaustive and may certainly be added to, deleted, or restricted significantly. The categories of information have been provided for purposes of example only and should be construed as such.

Table 28 may alternatively include (and be indexed by) any other suitable information pertinent to communication sessions or flows propagation in communication system 10. For example, table 28 may include the number of PDPs, policy/profile/subscription information, source IP address, destination IP address, protocol, IP address of end user 12, source and destination ports, or capability characteristics of devices being employed by end user 12. These elements may be used to differentiate quality of services or to implement different policies for handling corresponding traffic.

In operation, table 28 may be used to store information about the GGSN pool and/or to store feedback information received by loadbalancer 26. Table 28 may be suitably updated by loadbalancer 26 or appropriately configured or designed in accordance with particular needs. Table 28 may be referenced at any appropriate time in order to make an informed loadbalancing decision.

Figure 3:
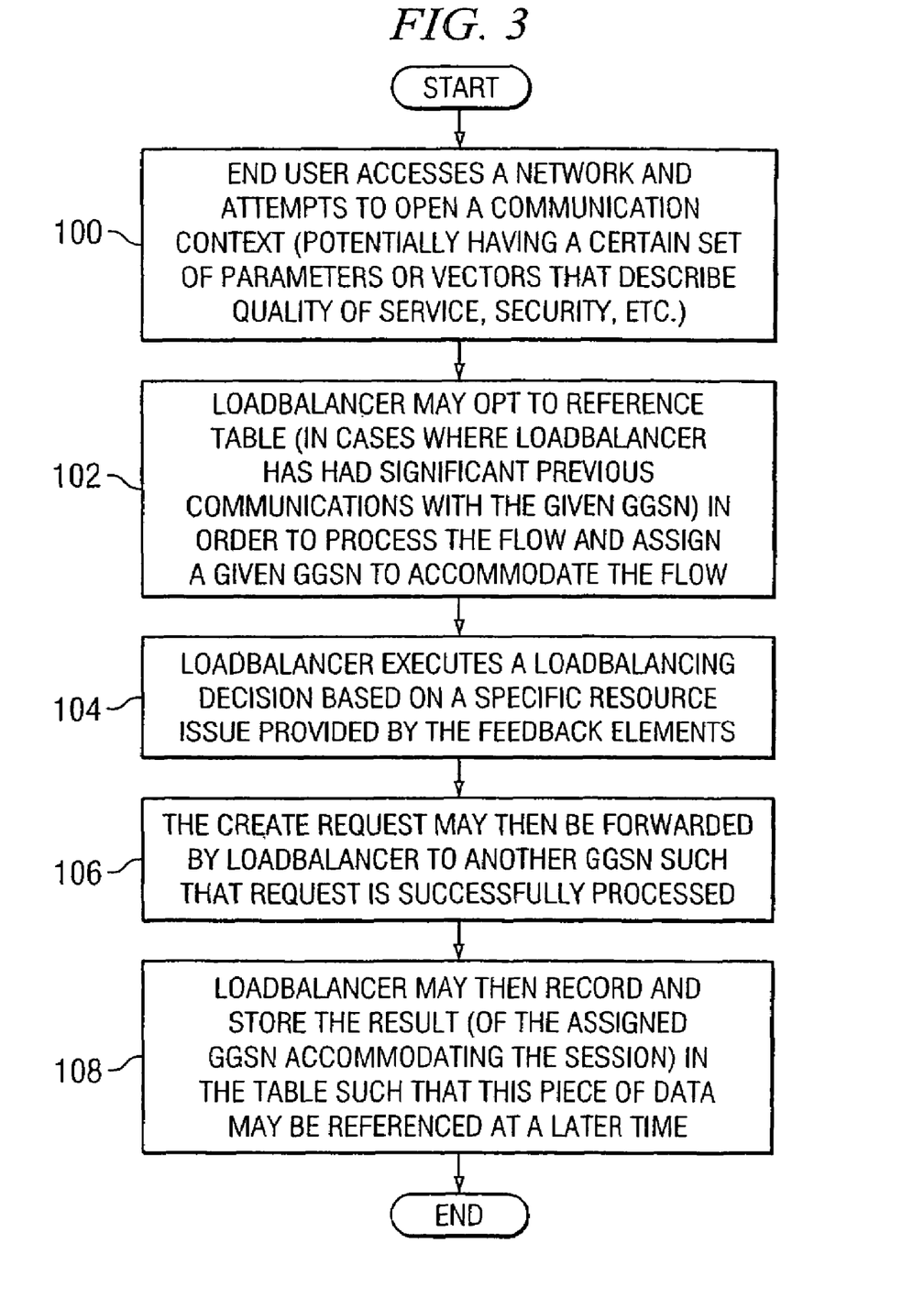
FIG. 3 is a flowchart illustrating a series of example steps associated with a method for loadbalancing in a network environment.

FIG. 3 is a simplified flowchart illustrating a series of example steps associated with a method for loadbalancing in a network environment. The method begins at step 100 where end user 12 may access a network in order to open a PDP context (potentially having a certain set of parameters or vectors that describe quality of service, security, etc.). For example, web traffic may be eventually communicated over the link because end user 12 has initiated his web browser via a GPRS phone. At step 102, loadbalancer 26 may opt to reference table 28 (in cases where loadbalancer 26 has had significant previous communications with the given GGSN) in order to process the flow and assign a given GGSN to accommodate the flow.

There may generic resource issues (e.g. CPU overload or memory overload) or more specific resource issues (e.g. the selected GGSN cannot accommodate this session based on a QoS parameter obtained from table 28 or database 50). In this example scenario, loadbalancer 26 may execute a loadbalancing decision based on a specific resource issue provided by feedback elements 42a and 42b at step 104.

The feedback provided at step 104 offers sufficient data to make an intelligent loadbalancing decision. Loadbalancer 26 can recognize that this is not a generic case of user failure (e.g. through authentication failure), but a failure that is caused by a specific resource issue. In this example, the GGSN that was originally contacted cannot handle the session because of its inability to process a certain QoS level. [Perhaps this may be due to an inability of the GGSN to support web traffic to be delivered to a GPRS phone.] The create request may be then be forwarded by loadbalancer 26 to another GGSN such that request is successfully processed at step 106. At step 108, loadbalancer 26 may then record and store the result (i.e. the assigned GGSN accommodating the session) in table 28 such that this piece of data can be referenced at a later time.

Thus, in the context of subsequent requests, a higher probability of success for future connections may be achieved by referencing table 28. Loadbalancer 26 is able to execute future loadbalancing decisions based on the information in table 28, or loadbalancer 26 may simply make a more informed loadbalancing decision based on the current feedback being provided by a given GGSN.

Some of the steps illustrated in FIG. 3 may be changed or deleted where appropriate and additional steps may also be added to the flowchart. These changes may be based on specific communication architectures or particular interfacing arrangements and configurations of associated elements and do not depart from the scope or the teachings of the present invention.

Although the present invention has been described in detail with reference to IP communications, communication system 10 may be used for any tunneling protocol involving user requests in a loadbalancing environment. Any suitable communications that involve the selection of a network node to facilitate end user communications may benefit from the teachings of the present invention. The use of end user 12 and IP communications have only been offered for purposes of teaching and should not be construed to limit the scope of the present invention in any way.

Moreover, the architecture of communication system 10 is not specific to tunneling protocols; it could also be used in front of application servers. For example, if a given server could identify a user's application requirements in the request and recognize that it lacks the capacity to provide such requirements, feedback information could be delivered to loadbalancer 26 to signal this condition, whereby another server is subsequently chosen. Further, consider another example case that includes a farm of video servers. A user request could indicate that a "High Definition Stream [is] Required." One server may not be able to handle this request at a given point in time while another would be able to accommodate such a flow. Any such permutations or modifications in the operations of loadbalancer 26 and associated components are within the broad teachings of communication system 10.

In addition, communication system 10 may be extended to any scenario in which end user 12 is provided with mobility (in the context of a wired or a wireless connection or coupling) and communicates with some type of access server (e.g. a network access server (NAS), foreign agents, etc.). End user 12 may use a dedicated connection of some form or use forms of multiple access protocols where appropriate. Access may be associated with point-to-point protocol (PPP) or alternatively with layer three protocols over an L2 layer in accordance with particular needs. Such an embodiment may include any suitable tunnel terminators and/or tunnel initiators that may be operable to communicate with loadbalancer 26.

Moreover, although communication system 10 has been illustrated with reference to particular elements facilitating the loadbalancing process, these elements may be replaced by any suitable architecture or configuration that achieves the intended functionality of communication system 10. Loadbalancer 26 executes loadbalancing decision based on feedback information and therefore may receive information pertaining to such a decision via any suitable element or object. Table 28 offers just one set of potential parameters that are provided by feedback information. Other parameters may be readily substituted into table 28 and, therefore, are clearly within the broad scope of the teachings of communication system 10. Such alternatives may be based on particular GGSN configurations or specific networking architectures. Additionally, such alternatives may be leveraged on existing communications between existing GGSNs and a loadbalancer, or provided in a separate protocol.

Numerous other changes, substitutions, variations, alterations, and modifications may be ascertained to one skilled in the art and it is intended that the present invention encompass all such changes, substitutions, variations, alterations, and modifications as falling within the spirit and scope of the appended claims. In order to assist the United States Patent and Trademark Office (USPTO) and additionally any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of filing hereof unless the words "means for" are specifically used in the particular claims; and (b) does not intend by any statement in the specification to limit his invention in any way that is not otherwise reflected in the appended claims.

What is claimed is:

1. An apparatus for loadbalancing in a network environment, comprising:
    a loadbalancer that operates to:
        receive a request from an end user for a communication session;
        receive feedback information from a selected network node of a plurality of network nodes, the feedback information comprising a rejection cause;
        determine if the rejection cause is local to the selected network node or applies to the plurality of network nodes;
        if the rejection cause is local to the selected network node, select another network node from the plurality of network nodes; and
        if the rejection cause applies to the plurality of network nodes, send a connection reject message to the end user.

2. The apparatus of claim 1, wherein the loadbalancer includes a first feedback element that is coupled to a second feedback element which is included in the selected network node, the first feedback element operating to receive the feedback information from the selected network node.

3. The apparatus of claim 2, wherein the loadbalancer includes a table that operates to store the feedback information associated with the selected network node.

4. The apparatus of claim 3, wherein the loadbalancer that operates to reference the table before making a subsequent loadbalancing decision.

5. The apparatus of claim 1, wherein the feedback information includes a selected one or more elements from a group of elements consisting of:
    a) a quality of service parameter associated with the selected network node;
    b) a quantity associated with a number of sessions to be accommodated by the selected network node;
    c) an ability of the selected network node to accommodate voice data; and
    d) an ability of the selected network node to accommodate video data.

6. A method for loadbalancing in a network environment, comprising:
    receiving a request from an end user for a communication session;
    receiving feedback information from a selected network node of a plurality of network nodes, the feedback information comprising a rejection cause;
    determining if the rejection cause is local to the selected network node or applies to the plurality of network nodes;
    if the rejection cause is local to the selected network node, selecting another network node is selected from the plurality of network nodes; and
    if the rejection cause applies to the plurality of network nodes, sending a connection reject message to the end user.

7. The method of claim 6, wherein the central node includes a table that operates to store the feedback information associated with the selected network node.

8. A method for loadbalancing in a network environment, comprising:
    receiving a request from an end user for a communication session at a central node; and
    identifying a selected one of a plurality of network nodes to facilitate the communication session for the end user based on feedback information provided by the selected network node, wherein the feedback information is communicated from the selected network node and processed by the central node before making a decision to establish the communication session between the selected network node and the end user, and wherein the feedback information includes a rejection cause and a loadbalancer is operating to determine if the rejection cause is local to the selected network node such that if it is, another network node is selected from the plurality of network nodes.

9. The method of claim 8, wherein the central node includes a first feedback element that is coupled to a second feedback element which is included in the selected network node, the first feedback element being operable to receive the feedback information from the second network node.

10. A system for loadbalancing in a network environment, comprising:
    means for receiving a request from an end user for a communication session;
    means for receiving feedback information from a selected network node of a plurality of network nodes, the feedback information comprising a rejection cause;
    means for determining if the rejection cause is local to the selected network node or applies to the plurality of network nodes;
    means for, if the rejection cause is local to the selected network node, selecting another network node is selected from the plurality of network nodes; and
    means for, if the rejection cause applies to the plurality of network nodes, sending a connection reject message to the end user.

11. The system of claim 10, further comprising:
    means for providing a table that operates to store the feedback information associated with the selected network node.

12. Software for loadbalancing in a network environment, the software being embodied in a computer readable medium and including code that operates to:

receive a request from an end user for a communication session at a central node;

receive feedback information from a selected network node of a plurality of network nodes, the feedback information comprising a rejection cause; cause determine if the rejection cause is local to the selected network node or applies to the plurality of network nodes;

if the rejection cause is local to the selected network node, select another network node from the plurality of network nodes; and if the rejection cause applies to the plurality of network nodes, send a connection reject message to the end user.

13. The medium of claim 12, wherein the code operates to store the feedback information associated with the selected network node in a table.

14. The medium of claim 13, wherein the code operates reference the table before making a subsequent loadbalancing decision.

* * * * *